United States Patent
Guerin et al.

(10) Patent No.: US 9,451,042 B2
(45) Date of Patent: *Sep. 20, 2016

(54) SCHEDULING AND EXECUTION OF DAG-STRUCTURED COMPUTATION ON RDMA-CONNECTED CLUSTERS

(71) Applicant: International Business Machines Corporation, Armonk, NY (US)

(72) Inventors: Xavier Rene Guerin, White Plains, NY (US); Yinglong Xia, Rye Brook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/970,202

(22) Filed: Dec. 15, 2015

(65) Prior Publication Data
US 2016/0105511 A1   Apr. 14, 2016

Related U.S. Application Data

(63) Continuation of application No. 14/014,722, filed on Aug. 30, 2013, now Pat. No. 9,300,749.

(51) Int. Cl.
*H04L 29/08* (2006.01)
*G06F 15/167* (2006.01)
*G06F 17/30* (2006.01)

(52) U.S. Cl.
CPC ......... *H04L 67/2842* (2013.01); *G06F 15/167* (2013.01); *G06F 17/30424* (2013.01);
(Continued)

(58) Field of Classification Search
CPC ................ H04L 67/1097; G06F 17/30949
See application file for complete search history.

(56) References Cited

U.S. PATENT DOCUMENTS

| 7,493,449 B2 | 2/2009 | Marwinski et al. |
| 7,797,393 B2 | 9/2010 | Qiu et al. |

(Continued)

OTHER PUBLICATIONS

Myers, A., Lecture 14, CS 312, Cornell University, Ithaca NY, Dec. 4, 2003, www.cs.cornell.edu/courses/cs312/lectures/lec14.html.

(Continued)

*Primary Examiner* — Oleg Survillo
*Assistant Examiner* — Christopher Cadorna
(74) *Attorney, Agent, or Firm* — Gates & Cooper LLP

(57) ABSTRACT

A server and/or a client stores a metadata hash map that includes one or more entries associated with keys for data records stored in a cache on a server, wherein the data records comprise a directed acyclic graph (DAG), and the directed acyclic graph is comprised of a collection of one or more nodes connected by one or more edges, each of the nodes representing one or more tasks ordered into a sequence, and each of the edges representing one or more constraints on the nodes connected by the edges. Each of the entries stores metadata for a corresponding data record, wherein the metadata comprises a server-side remote pointer that references the corresponding data record stored in the cache. A selected data record is accessed using a provided key by: (1) identifying potentially matching entries in the metadata hash map using the provided key; (2) accessing data records stored in the cache using the server-side remote pointers from the potentially matching entries; and (3) determining whether the accessed data records match the selected data record using the provided key.

18 Claims, 11 Drawing Sheets

(52) U.S. Cl.
CPC ... *G06F17/30917* (2013.01); *G06F 17/30949* (2013.01); *G06F 17/30958* (2013.01); *H04L 67/1097* (2013.01)

(56) References Cited

U.S. PATENT DOCUMENTS

| | | | |
|---|---|---|---|
| 7,941,401 B2 | 5/2011 | Okamoto | |
| 8,046,425 B1 | 10/2011 | Gopalan et al. | |
| 8,161,353 B2 | 4/2012 | Flynn | |
| 8,392,798 B2 | 3/2013 | Flynn | |
| 8,576,861 B2 | 11/2013 | Cardona | |
| 8,793,467 B2 | 7/2014 | Colgrove | |
| 8,861,527 B1 | 10/2014 | Bao et al. | |
| 8,904,004 B2 | 12/2014 | Havemose | |
| 9,075,710 B2 | 7/2015 | Talagala | |
| 2002/0038390 A1 | 3/2002 | Callsen et al. | |
| 2003/0159006 A1 | 8/2003 | Frank et al. | |
| 2004/0010612 A1 | 1/2004 | Pandya | |
| 2006/0036602 A1 | 2/2006 | Unangst et al. | |
| 2006/0143359 A1 | 6/2006 | Dostert et al. | |
| 2006/0143427 A1 | 6/2006 | Marwinski et al. | |
| 2006/0143595 A1 | 6/2006 | Dostert et al. | |
| 2006/0277180 A1 | 12/2006 | Okamoto | |
| 2007/0294512 A1* | 12/2007 | Crutchfield | G06F 8/443 712/200 |
| 2009/0125882 A1 | 5/2009 | Frigo et al. | |
| 2010/0031000 A1 | 2/2010 | Flynn et al. | |
| 2010/0082766 A1 | 4/2010 | Dreier | |
| 2010/0262694 A1 | 10/2010 | Havemose | |
| 2011/0022801 A1 | 1/2011 | Flynn | |
| 2011/0055471 A1 | 3/2011 | Thatcher et al. | |
| 2011/0099553 A1 | 4/2011 | Agarwal et al. | |
| 2011/0219378 A1 | 9/2011 | Sinz | |
| 2012/0124030 A1* | 5/2012 | Seetharama | G06F 17/30876 707/716 |
| 2012/0204024 A1 | 8/2012 | Augenstein et al. | |
| 2012/0210095 A1 | 8/2012 | Nellans et al. | |
| 2014/0165049 A1* | 6/2014 | Diamos | G06F 8/443 717/156 |
| 2014/0229600 A1 | 8/2014 | Shetty et al. | |
| 2014/0280024 A1 | 9/2014 | Baskett et al. | |
| 2015/0012539 A1 | 1/2015 | McHugh et al. | |

OTHER PUBLICATIONS

IPCOM000196714D; "High Performance Cache With LRU Replacement Policy"; http://priorartdatabase.com/IPCOM/196714; Jun. 12, 2010.

Oliver, JK.; "Cache Hash Overflow Table for Computers Using Cache Memory"; http://www.ip.com/pubview/IPCOM000035915D; Jan. 28, 2005.

* cited by examiner

SCHEDULING AND EXECUTION OF DAG-STRUCTURED COMPUTATION ON RDMA-CONNECTED CLUSTERS

CROSS-REFERENCE TO RELATED APPLICATIONS

This application is a continuation of the following co-pending and commonly-assigned patent application:

U.S. Utility patent application Ser. No. 14/014,722, filed on Aug. 30, 2013, by Xavier Rene Guerin and Yinglong Xia, entitled "SCHEDULING AND EXECUTION OF DAG-STRUCTURED COMPUTATION ON RDMA-CONNECTED CLUSTERS,";

which application is incorporated by reference herein.

This application is related to the following co-pending and commonly-assigned patent applications:

U.S. Utility patent application Ser. No. 13/683,319, filed on Nov. 21, 2012, by Xavier R. Guerin and Tiia J. Salo, entitled "RDMA-OPTIMIZED HIGH-PERFORMANCE DISTRIBUTED CACHE,";

U.S. Utility patent application Ser. No. 13/872,007, filed on Apr. 26, 2013, by Xavier R. Guerin and Tiia J. Salo, entitled "RDMA-OPTIMIZED HIGH-PERFORMANCE DISTRIBUTED CACHE,"; and U.S. Utility patent application Ser. No. 13/904,843, filed on May 29, 2013, by Yuqing Gao, Xavier R. Guerin and Graeme Johnson, entitled "HIGH PERFORMANCE, DISTRIBUTED, SHARED, DATA GRID FOR DISTRIBUTED JAVA VIRTUAL MACHINE RUNTIME ARTIFACTS,";

which applications are incorporated by reference herein.

STATEMENT REGARDING FEDERALLY SPONSORED RESEARCH AND DEVELOPMENT

This invention was made with Government support under Grant No. W911NF-11-C-0200 awarded by the Defense Advanced Research Projects Agency (DARPA). The Government has certain rights in this invention.

BACKGROUND OF THE INVENTION

1. Field of the Invention

This invention relates in general to database management systems performed by computers, and in particular, to an RDMA-optimized high performance distributed cache.

2. Description of Related Art

Today's customer demand for instant responsiveness drives applications to exploit various caching schemes. Small-scale applications can rely on local caching and replication. However, when scaling out Internet applications, and the use of clouds, where server-affinity across requests cannot be guaranteed and the data volumes involved are massive, local caching cannot be used anymore. Instead, systems have to rely on partitioned and distributed caches (e.g. Web Sphere Extreme Scale™ or Oracle Coherence™) that have to be accessed remotely.

A conventional key-value cache architecture is such that the client sends a request for data to a server over a network passing a key as a parameter. The server performs a key lookup (usually hash-based) in its cache for the associated object-value, e.g., a handle for or pointer to a data object. If found, the data object is serialized and returned to the client. Upon receiving the serialized data object, the client deserializes it and returns it to the requesting application.

SUMMARY OF THE INVENTION

According to one or more embodiments of the present invention, a method, apparatus, and article of manufacture is provided for accessing one or more data records stored in a cache on a server, wherein the data records comprise a directed acyclic graph (DAG), the directed acyclic graph is comprised of a collection of one or more nodes connected by one or more edges, each of the nodes representing one or more tasks ordered into a sequence, and each of the edges representing one or more constraints on the nodes connected by the edges.

A server and/or a client stores a metadata hash map that includes one or more entries associated with keys for the data records stored in the cache on the server. Each of the entries stores metadata for a corresponding data record, wherein the metadata comprises a server-side remote pointer that references the corresponding data record stored in the cache. A selected data record is accessed using a provided key by: (1) identifying one or more potentially matching entries in the metadata hash map using the provided key; (2) accessing one or more data records stored in the cache on the server using the server-side remote pointers from the potentially matching entries in the metadata hash map; and (3) determining whether the accessed data records match the selected data record using the provided key.

BRIEF DESCRIPTION OF THE DRAWINGS

Referring now to the drawings in which like reference numbers represent corresponding parts throughout.

DETAILED DESCRIPTION OF THE INVENTION

Figure 1:
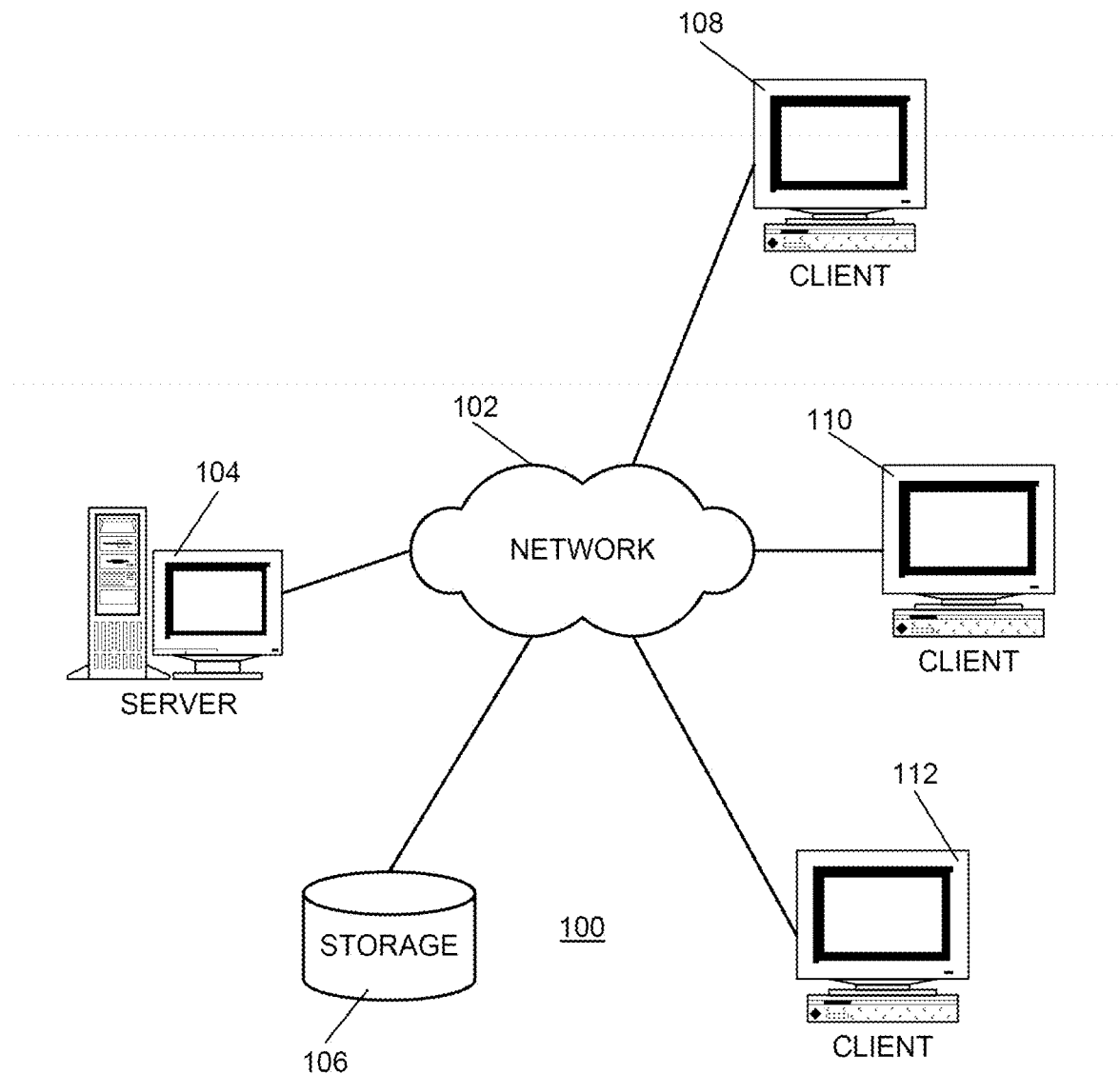
FIG. 1 is a diagram illustrating an exemplary network data processing system that could be used to implement elements of at least one embodiment of the present invention.

In the following description, reference is made to the accompanying drawings which form a part hereof, and in which is shown by way of illustration one or more specific embodiments in which the invention may be practiced. It is to be understood that other embodiments may be utilized and structural and functional changes may be made without departing from the scope of the present invention.

Overview

The flow described in the above "Description of Related Art" has to pass through a TCP/IP stack at least four times, e.g., Client to Network Interface Controller (NIC), NIC to Server, Server to NIC, and NIC to Client. Moreover, the data object has to undergo a (de)serialization operation twice, and the data object gets copied multiple times as it flows through the numerous I/O stack layers. As a result, remote access may be as much as three orders of a magnitude slower than local access (i.e., hundreds of microseconds vs. nanoseconds). This either completely prevents scaling out the applications or makes the applications prohibitively slow.

Embodiments of the invention described herein include a re-architected, distributed key-value pair cache that is configured suitably for RDMA (Remote Direct Memory Access) communication, avoids the above described TCP/IP protocol stack issues, and reduces operating system involvement for data transfers. This results in extremely fast, key-based cache lookups over a network.

The server stores all cache entries in large pre-allocated and pinned/registered memory pages. For each entry that is added to the cache, metadata is created that contains information about the location of the entry in the cache, as well as the version of the key for the entry. The metadata can be used to access the cache entries from outside of the server via an RDMA network adapter.

The server contiguously stores the key and data values of an entry in a memory region allocated by a RDMA-aware store. The key also includes a unique version identifier, which is equivalent to the one stored in its metadata. The server stores handles or pointers to the cache entries and the version identifiers for the keys in a metadata hash map that is hashed by the entry's key.

Instead of providing clients with a remote get/put interface to the cache stored on the server, the server provides the clients with some or all of the metadata hash map that contains key-value pairs made of the cache entries' keys paired to metadata comprising their remote RDMA pointers and the keys' version identifiers. The metadata hash map allows a client to look up a cache entry's metadata using a key, and then access the cache entry on the server using the remote RDMA pointer in a one-sided RDMA operation and performing a comparison with the version identifier for the key.

One-sided RDMA operations do not involve server-side software, because these operations are performed by an RDMA NIC, wherein the NIC performs a DMA operation directly to or from the server's memory, which results in very low server CPU utilization even under a heavy load. Specifically, read, update and delete operations can be implemented using one-sided RDMA operations, while create operations require some server-side software involvement, because create operations introduce new keys.

The complete metadata hash map is stored on the server, while the clients may store the complete metadata hash map or only a subset of entries from the metadata hash map. The metadata hash map is kept relatively small having a size in the 10s of megabytes (MBs) for even a large cache having a size in the 10s of gigabytes (GBs) by using advanced hashing techniques that substantially reduce collisions and hence avoid storing the keys in the client memory.

At startup, the client starts with an empty metadata hash map, which acts as a local metadata cache, and the metadata hash map is updated thereafter as the client accesses the cache. Hence, the client reacts differently to cache misses, cache hits, and stale metadata. The client uses its metadata hash map to locally look up a remote cache entry's handle and use it to directly perform CRUD (Create, Read, Update, Delete) operations on the entry over RDMA.

As a result, the present invention can be used for global storage of, and faster access to, data necessary for various applications, such as various enterprise applications. Embodiments of the present invention also can be used for global storage of, and faster access to, data resulting from real-time monitoring and analytics. In addition, embodiments of the present invention can be used for any data processing at Internet Scale messaging rates.

Thus, the advantages presented by embodiments of this invention are substantial and almost disruptive in nature. The RDMA-optimized cache "leapfrogs" the performance of prior art techniques by increasing throughput and accelerating latency-critical scenarios that depend on access to distributed data.

Hardware and Software Environment

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

With reference now to FIG. 1, a pictorial representation of a network data processing system 100 is presented in which the present invention may be implemented. Network data processing system 100 contains a network 102, which is the medium used to provide communications links between various devices and computers connected together within network data processing system 100. Network 102 may include connections, such as wire, wireless communication links, or fiber optic cables etc.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and programs to clients 108, 110 and 112. Clients 108, 110 and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another.

Figure 2:
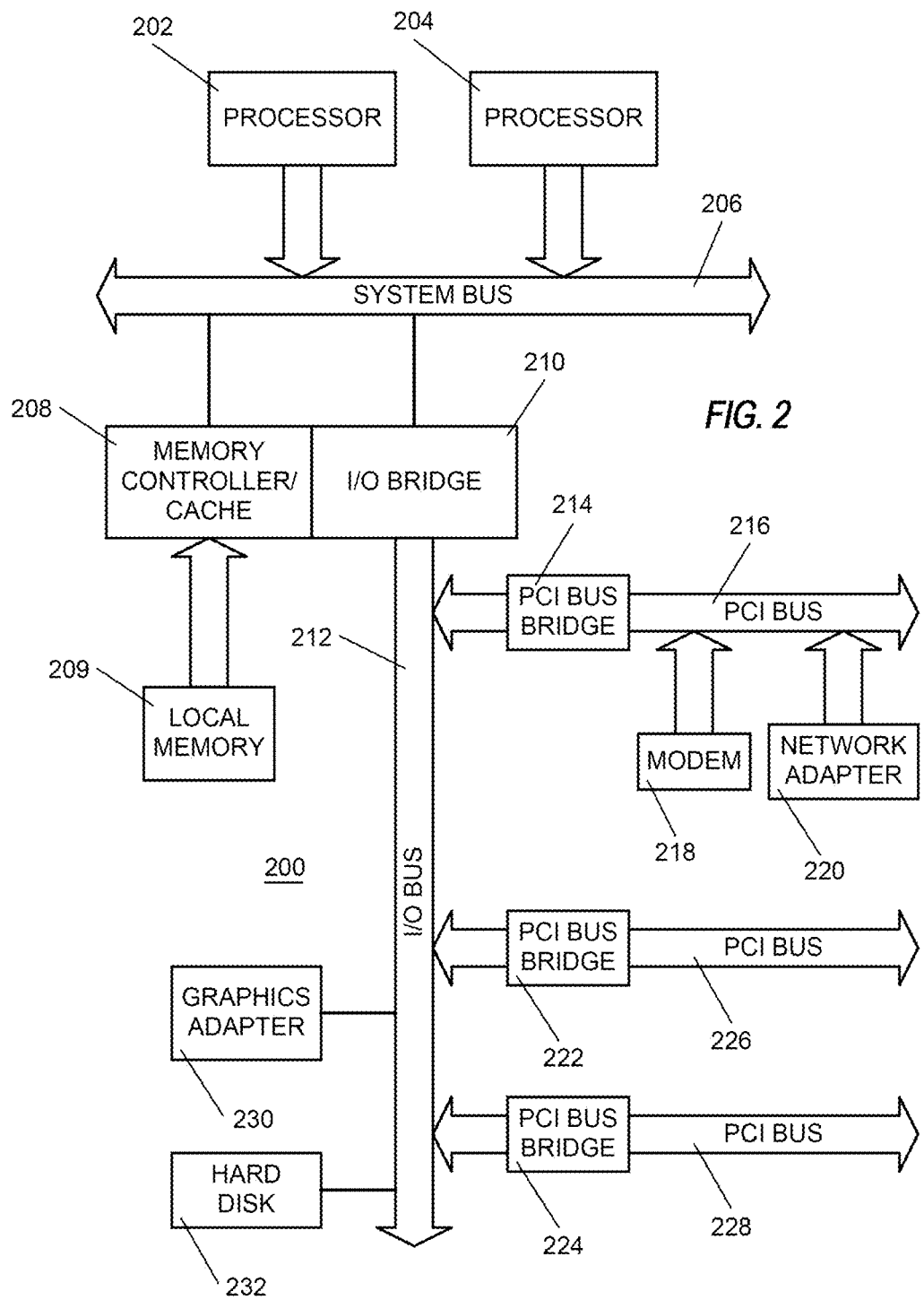
FIG. 2 is a diagram illustrating an exemplary data processing system that could be used to implement elements of at least one embodiment of the present invention.

Referring to FIG. 2, a block diagram of a data processing system that may be implemented as a server, such as Server 104 in FIG. 1, is depicted in accordance with an embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to network computers 108, 110 and 112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM e-Server pSeries system, a product of International Business Machines Corporation in Armonk, N.Y., running the Advanced Interactive Executive (AIX) operating system or LINUX operating system.

Server 104 may provide a suitable web site or other internet-based graphical user interface accessible by users to enable user interaction for aspects of an embodiment of the present invention. In one embodiment, Netscape web server, IBM Web Sphere Internet tools suite, an IBM DB2 for Linux, Unix and Windows (also referred to as "IBM DB2 for LUW") platform and a Sybase database platform are used in conjunction with a Sun Solaris operating system platform. Additionally, components such as JBDC drivers, IBM connection pooling and IBM MQ series connection methods may be used to provide data access to several sources. The term webpage as it is used herein is not meant to limit the type of documents and programs that might be used to interact with the user. For example, a typical web site might include, in addition to standard HTML documents, various forms, Java applets, JavaScript, active server pages (ASP), Java Server Pages (JSP), common gateway interface scripts (CGI), extensible markup language (XML), dynamic HTML, cascading style sheets (CSS), helper programs, plug-ins, and the like.

Figure 3:
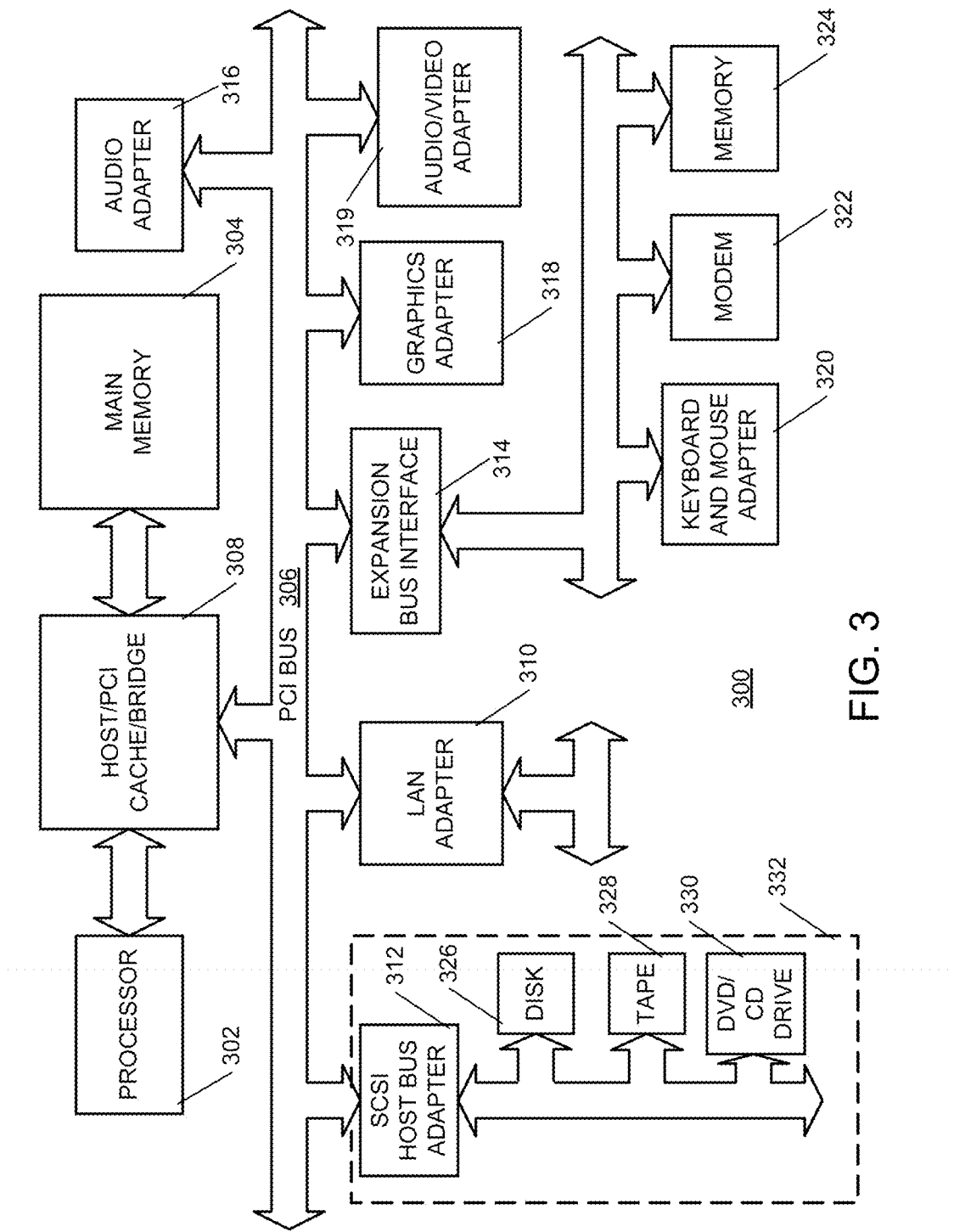
FIG. 3 is a diagram illustrating an exemplary data processing system that could be used to implement elements of at least one embodiment of the present invention.

With reference now to FIG. 3, a block diagram illustrating a data processing system is depicted in which aspects of an embodiment of the invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots.

Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP®, which is available from Microsoft Corporation. An object oriented programming system such as Java may run in conjunction with the operating system and provide calls to the operating system from Java programs or programs executing on data processing system 300. "Java" is a trademark of Sun Microsystems, Inc. Instructions for the operating system, the object-oriented operating system, and programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 may also be a notebook computer or hand held computer as well as a PDA. Further, data processing system 300 may also be a kiosk or a Web appliance. Further, the present invention may reside on any data storage medium (i.e., floppy disk, compact disk, hard disk, tape, ROM, RAM, etc.) used by a computer system. (The terms "computer," "system," "computer system," and "data processing system" and are used interchangeably herein.)

RDMA-Optimized Caching

Figure 4A:
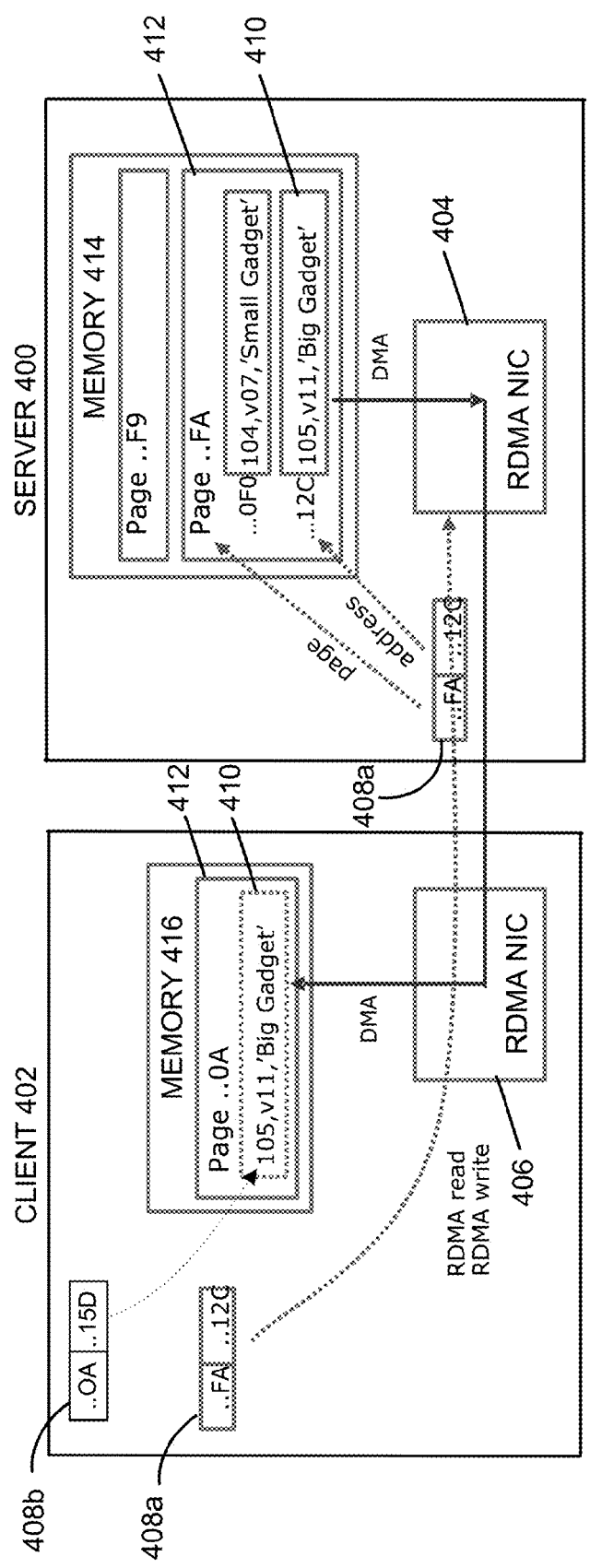
FIG. 4A is a schematic that illustrates a system environment using RDMA for caching, according to at least one embodiment of the present invention.

FIG. 4A is a schematic that illustrates a system environment using RDMA for caching, which includes a Server 400 connected to a Client 402 by means of RDMA NICs 404 and 406, wherein the RDMA NICs 404 and 406 communicate using standard networking protocols. A central concept of RDMA is the use of remote pointers 408a, 408b. The Server 400 exports a server-side remote pointer 408a to the Client 402 that refers to a data record 410 in a pinned and registered page 412 stored in the memory 414 of the Server 400. Similarly, the Client 402 may have a client-side remote pointer 408b that refers to a data record 410 in a pinned and registered page 412 stored in the memory 416 of the Client 402, which may or may not be exported to the Server 400. In both instances, the pointers 408a, 408b comprise handles that include a page 412 value and an address value for the record 410. The records 410 stored in pages 412 in the memory 414 of the Server 400 provide a cache, while the records 410 stored in pages 412 in the memory 416 of the Client 402 provide data for one or more applications executed by the Client 402 (not shown). One-sided RDMA operations allow the Client 402 to directly access (read and overwrite) the record 410 stored in the page 412 in the memory 414 of the Server 400 using the server-side remote pointer 408a.

Specifically, the RDMA NIC 406 of the Client 402 remotely controls the RDMA NIC 404 of the Server 400. A remote pointer 408a is retrieved from the memory 416 of the Client 402. The RDMA NIC 406 then transmits the remote pointer 408a to the RDMA NIC 404 of the Server 400. The RDMA NIC 404 performs DMA (Direct Memory Access) operations transferring records 410 into and out of the memory 414 of the Server 400 as specified by the remote pointer 408a. Similarly, the RDMA NIC 406 of the Client 402 performs DMA operations transferring records 410 into and out of the memory 416 of the Client 402, which may be specified or otherwise associated with the remote pointer 408b.

These RDMA operations do not require execution of any software in the Server 400 or Client 402, and thus there is no CPU involvement and no CPU utilization on the Server 400 or Client 402. Consequently, this results in very fast, near wire-speed, remote access by the Client 402 into and out of the memory 414 of the Server 400 (and similarly, remote access by the Server 400 into and out of the memory 416 of the Client 402). For example, a read or overwrite by the Client 402 of a record 410 stored in the memory 414 of the Server 400 can occur within single-digit microseconds.

Figure 4B:
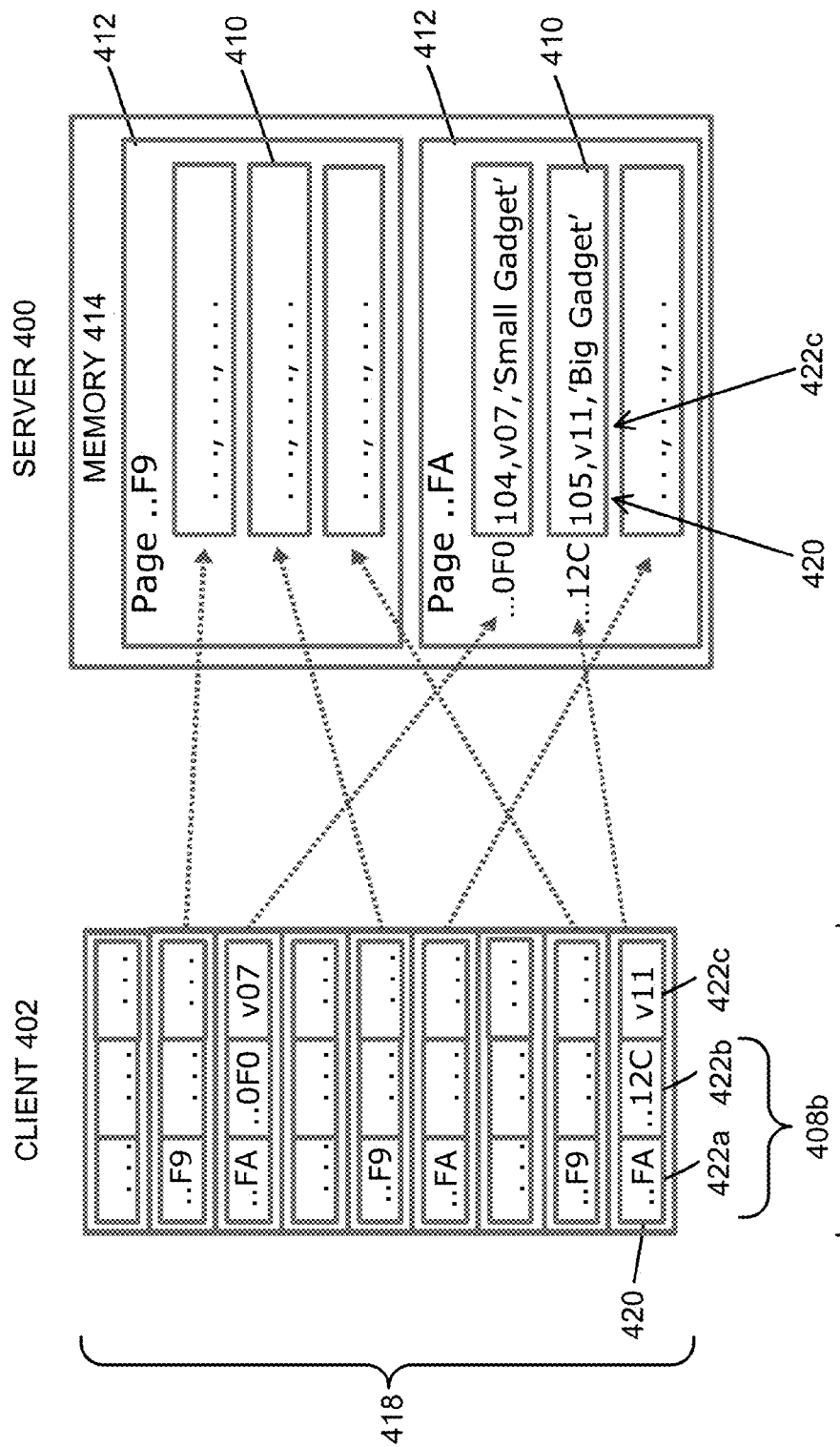
FIG. 4B is a schematic that illustrates a metadata hash map used with RDMA operations, according to at least one embodiment of the present invention.

In one embodiment of the present invention, a metadata hash map 418 is used with the RDMA operations, as shown in FIG. 4B. The Server 400 creates the metadata hash map 418, wherein each entry or slot in the metadata hash map 418 is associated with a key 420 for a record 410, wherein the key 420 is hashed to select the slot in the hash map 418. The associated entry in the metadata hash map 418 stores an object-value 422 comprising metadata for the record 410, wherein the metadata includes the server-side remote pointer 408a for the record 410, including an address 422a for the page 412 storing the record 410 and an address 422b for the record 410 within the page 412, as well as a version identifier 422c for the key 420. The metadata may also include a size (not shown) for the record 410.

The size of the metadata hash map 418 is typically only a fraction of the amount of memory 414 allocated for the records 410 and pages 412. For example, the metadata hash map 418 may have a size in the 10s of megabytes as compared to the pages 412 in memory 414 allocated for the records 410 that may have a size in the 10s of gigabytes. The metadata hash map 418 can be kept relatively small by using advanced hashing techniques that substantially reduce collisions (e.g., the metadata hash map 418 does not need to contain the keys 420 for all entries, but only for those slots that have actual collisions).

Figure 4C:
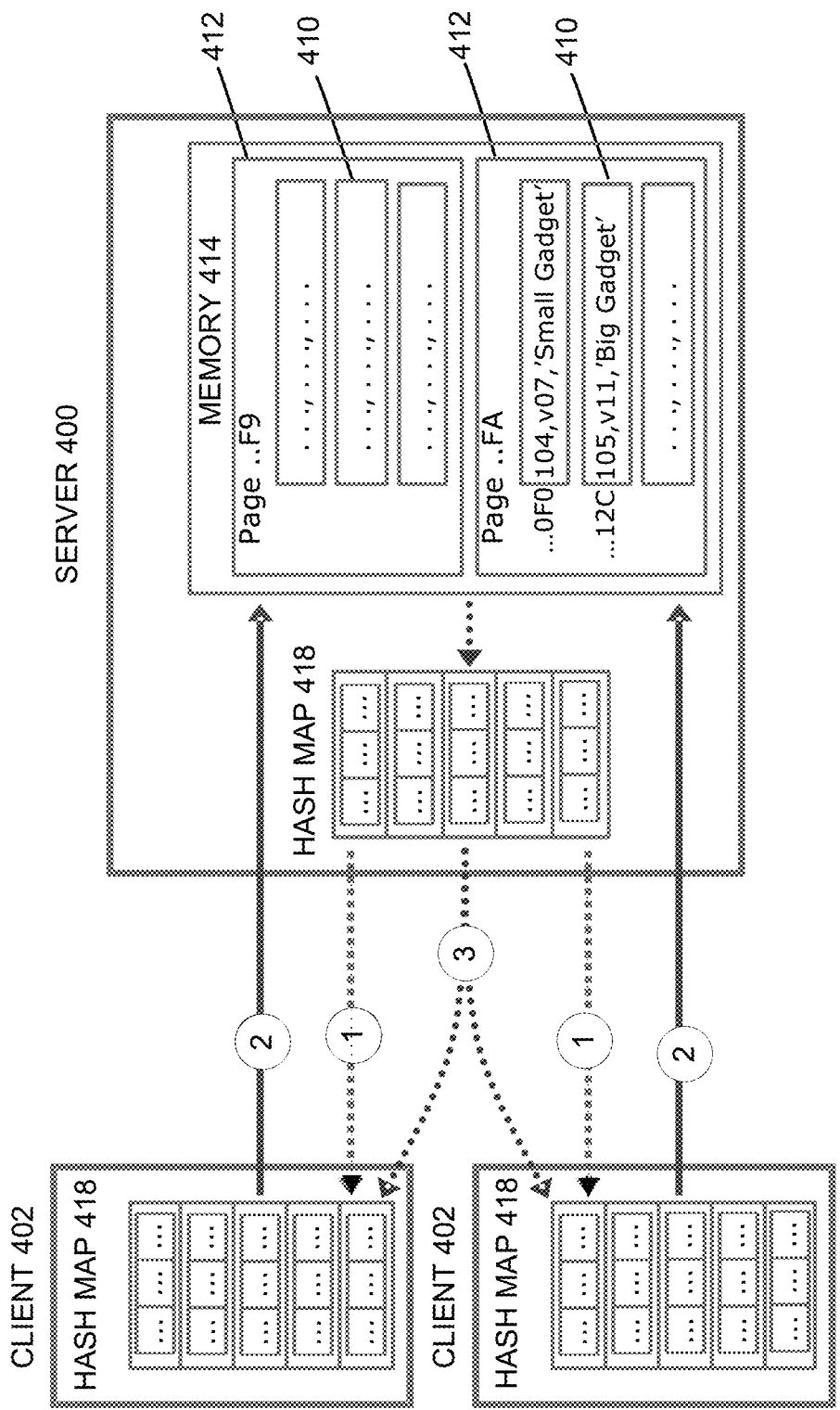
FIG. 4C is a schematic that illustrates a server transmitting entries from a metadata hash map to one or more clients at some designated time, according to at least one embodiment of the present invention.

As illustrated in FIG. 4C, the Server 400 transmits one or more entries from its metadata hash map 418 to one or more Clients 402 at some designated time, as represented by arrow (1). Generally, this will occur when the metadata hash map 418 on the Server 400 is updated in response to a CRUD (Create, Read, Update, Delete) operation performed by the Server 400 at the direction of the Client 402.

Typically, the Clients 402 will only maintain a subset of the entries found in the metadata hash map 418 of the Server 400 in their local copy of the metadata hash map 418. The Clients 402 can use their local copy of the metadata hash map 418 to locally look up metadata associated with the records 410 using the keys 420, in order to perform CRUD (Create, Read, Update, Delete) operations using RDMA on records 410 stored in the memory 414 of the Server 400, as represented by arrow (2).

Finally, the Server 400 transmits one or more entries from its metadata hash map 418 to one or more Clients 402 at some other designated times, as represented by arrows (3). For example, this may also occur, e.g., when requested by the Client 402, at Client 402 startup, when requested by the Server 400, at Server 400 startup, when the metadata hash map 418 changes for other reasons, or at other intervals, etc.

CRUD Operations

The specifics of the CRUD operations performed using the RDMA-optimized cache of embodiments of the present invention are described in more detail below. As noted previously, the reading and overwriting of records 410 involves little or no execution of any software in the Server 400, and thus there is little or no CPU involvement and little or no CPU utilization on the Server 400. On the other hand, the creation or deletion of records 410 may require more execution of software in the Server 400.

Moreover, the creation, deletion or update of records 410 may also require that copies of entries in the metadata hash map 418 maintained on the Server 400 be transmitted to the Client 402, so that the copy of the metadata hash map 418 on the Client 402 can be updated when records 410 are created, deleted or updated.

Create

In a Create (or Insert) operation, the following steps are performed:

The Client 402 performs an RDMA-send operation and passes a key 420 from the new record 410, a hash code for the key 420, and a value for the key 420.

The Server 400 allocates and registers a new record 410 in a page 412 in its memory 414. Associated with the new record 410 is the key 420 and the value for the key 420 received from the Client 402, as well as object-value 422 comprising metadata for the new record 410, wherein the metadata comprises the server-side remote pointer 408a for the new record 410 (i.e., a local pointer to the Server 400), including an address 422a for the page 412 storing the record 410 and an address 422b for the record 410 within the page 412, as well as a version identifier 422c for the key 420.

The Server 400 uses the hash code for the key 420 to identify the slot in the metadata hash map 418 and adds the object-value 422 comprising metadata for the new record 410 to the slot in the metadata hash map 418, wherein the metadata comprises the server-side remote pointer 408a for the new record 410 (i.e., a local pointer to the Server 400), including an address 422a for the page 412 storing the record 410 and an address 422b for the record 410 within the page 412, as well as a version identifier 422c for the key 420. If successful, the Server 400 transmits an acknowledgement (ACK) to the Client 402, including the object-value 422 from the metadata hash map 418 for the new record 410. When the Client 402 receives the ACK, its metadata hash map 418 is updated by adding the object-value 422 in the slot in the metadata hash map 418.

Otherwise, if unsuccessful, the Server 400 transmits a non-acknowledgement (NACK) to the Client 402. When the Client 402 receives the NACK, it returns an error indication to one or more applications.

The results of the Create (or Insert) operation include the following:

The cache on the Server 400 includes a new record 410.

The metadata hash map 418 on the Server 400 is updated to reflect the current state of the cache on the Server 400.

One or more entries in the metadata hash map 418 on the Client 402 are updated to reflect the current state of the cache on the Server 400.

The latency of the Create (or Insert) operation is:

Typically 10-30 µs for the create operation on the Server 400.

An additional 10-15 µs until the Clients 402 have received object-value 422

Read

In a Read operation, the following steps are performed:

The Client 402 hashes the key 420 of the desired record 410 to identify one or more entries in its copy of the metadata hash map 418 storing the object-value 422 comprising metadata for the record 410, wherein the metadata comprises the server-side remote pointer 408*a* for the record 410, including an address 422*a* for the page 412 storing the record 410 and an address 422*b* for the record 410 within the page 412, as well as a version identifier 422*c* for the key 420.

Specifically, the hashing of the key 420 returns a set of one or more potentially matching entries from the metadata hash map 418. A low collision hashing function ensures that sets with more than one potentially matching entry from the metadata hash map 418 is rare.

For each potentially matching entry, the following steps are performed:

The Client 402 allocates and registers a local data structure for a record 410 in a page 412 in its memory 416. (This can be done once, at startup, and reused for subsequent operations.) Associated with the local data structure, and referencing both the record 410 and page 412, is a client-side remote pointer 408*b*.

The Client 402 performs a one-sided RDMA-read operation on the Server 400, using the server-side remote pointer 408*a* from the hash map 418 as the source and the client-side remote pointer 408*b* as the target, and the record 410 on Server 400 is copied into the record 410 on the Client 402.

The Client 402 determines whether the key 420 in the record 410 returned from the Server 400 matches the key 420 of the desired record 410.

If the keys 420 match, then Client 402 determines whether the version identifier 422*c* in the record 410 returned from the Server 400 matches the version identifier 422*c* found in the object-value 422 of the metadata hash map 418 stored on the Client 402.

If the version identifiers 422*c* match, then the key 420 is valid and the record 410 is valid. The Client 402 can either use the data in its record 410 as-is or copy it somewhere else.

If the version identifiers 422*c* do not match, then the entry in the metadata hash map 418 is stale and the entry is removed from the metadata hash map 418.

Upon completion, the Client 402 can either keep or free any allocated memory.

If the key 420 was not matched, or if the key 420 was matched but the version identifier 422*c* was not matched, then the Client 402 sends the key 420 to the Server 400 with an active request to retrieve the associated data record 410. In response, the Server 400 may transmit an acknowledgement (ACK) to the Client 402 and return the associated data record 410, which includes the key 420, and the object-value 422, and the Client 402 returns the data record 410 to one or more applications and updates its metadata hash map 418 with the object-value 422. Otherwise, if unsuccessful, the Server 400 transmits a non-acknowledgement (NACK) to the Client 402, and the Client 402 returns an error indication to one or more applications.

The results of the Read operation include the following:

The metadata hash map 418 on the Client 402 may be updated with a new or valid object-value 422 for the requested key 420.

The data record 410 or an error indication may be returned to one or more applications.

The latency of the Read operation is:

Typically 3-10 μs when the key and version identifier are matched; otherwise, 10-30 μs to request a data record 410 from the Server 400.

Update

In an Update operation, the following steps are performed:

The Client 402 hashes the key 420 of the desired record 410 to identify one or more entries in its copy of the metadata hash map 418 storing the object-value 422 comprising metadata for the record 410, wherein the metadata comprises the server-side remote pointer 408*a* for the record 410, including an address 422*a* for the page 412 storing the record 410 and an address 422*b* for the record 410 within the page 412, as well as a version identifier 422*c* for the key 420.

Specifically, the hashing of the key 420 returns a set of one or more potentially matching entries from the metadata hash map 418. A low collision hashing function ensures that sets with more than one potentially matching entry from the metadata hash map 418 is rare.

For each potentially matching entry, the following steps are performed:

The Client 402 allocates and registers a local data structure for a record 410 in a page 412 in its memory 416. (This can be done once, at startup, and reused for subsequent operations.) Associated with the local data structure, and referencing both the record 410 and page 412, is a client-side remote pointer 408*b*.

The Client 402 performs a one-sided RDMA-read operation on the Server 400, using the server-side remote pointer 408*a* from the hash map 418 as the source and the client-side remote pointer 408*b* as the target, and the record 410 on Server 400 is copied into the record 410 on the Client 402.

The Client 402 determines whether the key 420 in the record 410 returned from the Server 400 matches the key 420 of the desired record 410.

If the keys 420 match, then Client 402 determines whether the version identifier 422*c* in the record 410 returned from the Server 400 matches the version identifier 422*c* found in the object-value 422 of the metadata hash map 418 stored on the Client 402.

If the version identifiers 422*c* match, then the key 420 is valid and the record 410 is valid. The Client 402 performs a one-sided RDMA-write operation on the Server 400, using the client-side remote pointer 408*b* as the source and the server-side remote pointer 408*a* from the hash map 418 as the target.

If the version identifiers 422*c* do not match, then the entry in the metadata hash map 418 is stale and the entry is removed from the metadata hash map 418.

Upon completion, the Client 402 can either keep or free any allocated memory.

If (a) the key 420 was not matched, or (b) the key 420 was matched but the version identifier 422*c* was not matched, or (c) the key 420 was matched and the version identifier 422*c* was matched but the size of the previous data record 410 is smaller than the size of the new data record 410, then the Client 402 sends the data record 410 to the Server 400 with an active request to update the associated data record 410 stored on the Server 400. The Server 400 generates a new version identifier and updates the data record 410, as well as the metadata hash map 418.

Upon receipt of the update request, the Server 400 locates the slot in its metadata hash map 418 for the key 420 passed in the message by the Client 402.

If the slot is valid, the Server 400 allocates and registers a new record 410 in a page 412 in its memory 414. Associated with the new record 410 is the key 420 and the new value for the key 420 received from the Client 402, as well as an object-value 422 comprising metadata for the new record 410, wherein the metadata comprises the server-side remote pointer 408a for the new record 410 (i.e., a local pointer to the Server 400), including an address 422a for the page 412 storing the new record 410 and an address 422b for the record 410 within the page 412, as well as a new version identifier 422c for the key 420.

Once the new record 410 is created, the Server 400 replaces the old record 410 in the associated slot in the metadata hash map 418 for the key 420 with the information from the new record 410, and removes the old record 410 by setting its version identifier as invalid and returning its memory region to the allocator's free pool.

If successful, the Server 400 transmits an acknowledgement (ACK) to the Client 402, and returns the key 420 and the updated object-value 422, wherein the Client 402 returns a success indication to one or more applications and updates its metadata hash map 418 with the updated object value 422.

Otherwise, if unsuccessful, the Server 400 transmits a non-acknowledgement (NACK) to the Client 402, and the Client 402 returns an error indication to one or more applications.

The results of the Update operation include the following:

The record 410 on the Client 402 is copied into the record 410 on the Server 400, thereby updating the cache on the Server 400.

The metadata hash map 418 on both the Server 400 and the Client 402 may be updated with a new or valid object-value 422 for the requested key 420.

The latency of the Update operation is:

Typically 2-5 µs when a match occurs; otherwise, 10-30 µs.

Delete

In a Delete operation, the following steps are performed:

The Client 402 hashes the key 420 and performs an RDMA-send operation passing the key 420 and a hash code for the key 420 to the Server 400.

The Server 400 uses the key 420 and the hash code for the key 420 to identify the entry in its copy of the metadata hash map 418 storing the object-value 422.

If the key 420 from the metadata hash map 418 on the Server 400 matches the key 420 received from the Client 402, then the entry is removed from the metadata hash map 418 on the Server 400, and the data record 410 is removed from the cache on the Server 400 (i.e., the version identifier is set as invalid and its memory is returned to the allocator's free pool).

If successful, the Server 400 transmits an acknowledgement (ACK) to the Client 402, including the object-value 422, and the Client 402 returns a success indication to one or more applications and removes the entry from its metadata hash map 418.

Otherwise, if unsuccessful, the Server 400 transmits a non-acknowledgement (NACK) to the Client 402, and the Client 402 returns an error indication to one or more applications.

The results of the Delete operation include the following:

The record 410 on the Server 400 may be deleted, and the metadata hash map 418 on the Server 400 may be updated.

The record 410 on the Client 402 may be deleted, and the metadata hash map 418 on the Server 400 may be updated.

The latency of the Delete operation is:

Typically 10-30 µs.

Other considerations related to the Delete operation include:

The Server 400 can perform "garbage collection" on its deleted records 410, and then update the hash map 418 to reflect the current state of the cache on the Server 400.

The metadata hash maps 418 on one or more Clients 402 may contain stale object-values 422. However, this will not break consistency, as the Client 402 should inspect the version identifiers 422 in the object-values 422 for correctness.

Metadata Hash Map Updates

As noted above, the Server 400 may transmit one or more entries from its metadata hash map 418 to one or more Clients 402 at some designated time, e.g., when a CRUD operation performed by the Server 400 at the direction of the Client 402 results in one or more entries of the metadata hash map 418 being updated, and only those updated entries are transmitted by the Server 400 and received by the Client 402. Moreover, the Server 400 may transmit one or more entries from its metadata hash map 418 to one or more Clients 402 at some other designated times, e.g., when requested by the Client 402, at Client 402 startup, when requested by the Server 400, at Server 400 startup, when the metadata hash map 418 changes for other reasons, or at other intervals, etc. In addition, updates to the hash map 418 may occur in bulk (e.g., the entire hash map 418) or incrementally (e.g., only changed entries in the hash map 418), or using some combination thereof.

In one embodiment, the Client 402 may start off with an empty metadata hash map 418 and relay "cache misses" to the Server 400 when the key 420 has not been found in its local metadata hash map 418, resulting in the object-value 422 comprising metadata for the record 410 being returned by the Server 400 to the Client 400, wherein the metadata comprises the server-side remote pointer 408a for the record 410, including an address 422a for the page 412 storing the record 410 and an address 422b for the record 410 within the page 412, as well as a version identifier 422c for the key 420. This embodiment has the following implications:

The size of the local metadata hash map 418 can be tuned to a desired number of entries.

Automatic entry eviction can be implemented on the Client 402 to free up entries in the local metadata hash map 418, although the policy used, such as time-to-live (TTL), least-recently-used (LRU), least-frequently-used (LFU), is application-dependent and may vary from one embodiment of the invention to another.

In other embodiments, any number of different techniques may be used in transmitting entries in the metadata hash map 418 from the Server 400 to the Client 402, and then subsequently updating the metadata hash map 418 on the Server 400 from the Client 402.

Logical Flow for Accessing the Cache

Figure 5:
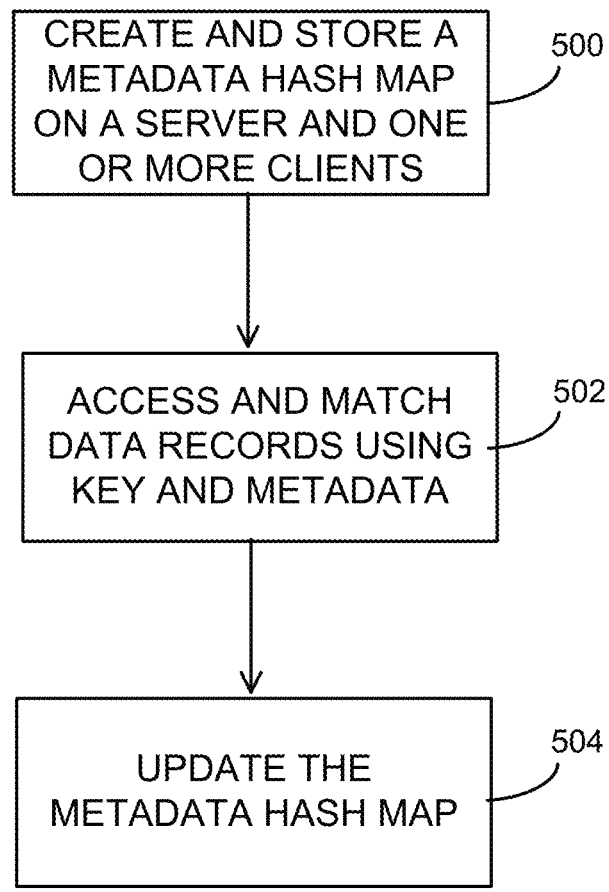
FIG. 5 is a flowchart that illustrates the general steps or functions for using an RDMA-optimized cache to access a data record stored in the cache on a server, according to at least one embodiment of the present invention.

FIG. 5 is a flowchart that illustrates the general steps or functions for accessing a data record 410 stored in a cache on a Server 400, according to one embodiment of the present invention.

Block 500 represents the step or function of storing a metadata hash map 418 on the Server 400 and/or one or more Clients 402, wherein the metadata hash map 418 includes one or more entries associated with a key 420 for a data record 410 stored in the cache on the Server 400, and each of the entries store an object-value 422 comprising metadata for a corresponding data record 410, wherein the metadata comprises the server-side remote pointer 408a that references the corresponding data record 410, including an address 422a for the page 412 storing the record 410 and an address 422b for the record 410 within the page 412, as well as a version identifier 422c for the key 420. Typically, the metadata hash map 418 on the Client 402 stores only a subset of the entries stored in the metadata hash map 418 on the Server 400, and the metadata hash map 418 on the Client 402 is updated only when a create, read, update or delete operation performed by the Server 400 at the direction of the Client 402 results in one or more entries of the metadata hash map 418 being updated, and only those updated entries are transmitted by the Server 400 and received by the Client 402.

Block 502 represents the step or function of the Client 402 or the Server 400 accessing a selected data record 410 stored in the cache on the Server 400 using a provided key 420 by: (1) identifying one more potentially matching entries in the metadata hash map 418 using the provided key 420; (2) accessing one or more data records 410 stored in the cache on the Server 400 using the server-side remote pointers 408a from the potentially matching entries in the metadata hash map 418; and determining whether the accessed data records 410 match the selected data record 410 using the provided key 420 and the version identifiers 422c from the potentially matching entries in the metadata hash map 418. Specifically, the data records 410 may be accessed by performing one or more RDMA operations on the Client 402 using the server-side remote pointer to directly access the data records 410 stored in the cache on the Server 400 via an RDMA NIC.

Block 504 represents an optional step or function of transmitting one or more entries from the metadata hash map 418 from the Server 400 to some or all of the Clients 402, in order to update the metadata hash map 418, in addition to the updates made in Block 500 (and generally triggered by events other than those described in Block 500).

Scheduling and Execution of DAG-Structured Computation on RDMA-Connected Clusters The cache system described above can be used in a number of different applications. One application of particular note is the use of the cache system for the scheduling and execution of directed acyclic graph (DAG) structured computations on RDMA-connected computing clusters. Many problems can be solved using DAG-structured computations. To ensure scalability, high-availability, reliability and quality of service (QoS), DAG-structured computations may be distributed across several nodes of a computing cluster, wherein each compute node or processor runs one or more tasks of the DAG-structured computations.

Background on DAG-Structured Computations

A directed acyclic graph (DAG) is comprised of nodes or vertices and directed edges, wherein each DAG edge connects one DAG node to another DAG node. Specifically, a DAG is a directed graph with no directed cycles, such that there is no way to start at a DAG node and follow a sequence of DAG edges that eventually loops back to the starting DAG node again.

DAGs may be used to model several different kinds of structures in mathematics and computer science. A collection of tasks that must be ordered into a sequence, subject to constraints that certain tasks must be performed earlier than others, may be represented as a DAG with a DAG node for each task and a DAG edge for each constraint, wherein topological ordering may be used to generate a valid sequence of the tasks.

For example, a Bayesian network is a probabilistic DAG with DAG nodes that represent random variables and DAG edges that represent conditional dependencies for the DAG nodes, such that DAG nodes which are not connected represent variables which are conditionally independent of each other. Each DAG node is associated with a conditional probability that takes as input a particular set of values for the DAG node's parent variables and gives the probability of the variable represented by the DAG node.

Analytic algorithms exist that perform inference and learning in Bayesian networks. However, analytic algorithms on DAG-structured computations are challenging to properly schedule and execute on large-scale computing clusters as the behavior of such algorithms usually depends on the shape of the graph used as input. As communications in large-scale computing clusters is usually several order of magnitudes more expensive that local in-memory computation, graph execution schedulers are likely to favor high data locality, leading to unbalanced loads across the compute nodes of the computing cluster (or below-than-average execution response time due to communication overheads).

Traditional approaches usually leverage static scheduling and data placement to minimize communications and therefore increase performance of the overall execution. These approaches usually lead to unbalanced computing cluster loads, eventually capping the ability of such solution to scale.

With more advanced algorithms, such as inference, the overall graph computation distribution cannot be computed statically as the actual execution is not only connected to the shape of the input graph, but also the data contained in each compute node that impact the parsing the graph itself. In these scenarios, dynamic scheduling must be used, involving the full migration of parts of graph data from one compute node to another.

These migrations typically are performed using active messaging (usually socket-based TCP/IP), which involves the entire software stack (from the application to the Ethernet driver) on both the requesting machine and the target machine, and consumes comparable amounts of CPU cycles on both. Therefore, performance scalability with such an approach is also problematic.

Besides, traditional distributed approaches also require the direct addressing of the remote compute node in memory, implying that the location of the requested remote compute nodes must be know beforehand, adding an extra burden on the programmer.

Overview of DAG-Structured Computations Using an RDMA Cache

The present invention solves these problems by supporting DAG-structured computations using a variant of the Client-Server RDMA cache system described above in FIGS. 4A, 4B, 4C and 5. Specifically, this invention enables executing DAG-structured computations across physically distributed compute nodes or processors, wherein elements of the DAG-structured computations are stored as data records in a cache on one or more Servers and referenced by one or more Clients via the distributed metadata hash map.

Specifically, the data records comprise a directed acyclic graph (DAG), and the directed acyclic graph is comprised of a collection of one or more DAG nodes connected by one or more DAG edges, wherein each of the DAG nodes represents one or more tasks ordered into a sequence, and each of the DAG edges represents one or more constraints on the DAG nodes connected by the DAG edges.

The Servers store the data records comprising the DAG-structured computations in the cache as pre-allocated and pinned/registered memory pages. For each data record that is added to the cache, metadata is created that contains information about the location of the data record in the cache, as well as the version of the key for the data record. The metadata can be used to access the data records in the cache using RDMA operations.

Each Server contiguously stores the key and data values of an entry in the metadata hash map. The key also includes a unique version identifier, which is equivalent to the one stored in its metadata. The Server stores handles or pointers to the data records in the cache and the version identifiers for the keys in a metadata hash map that is hashed by the key.

Instead of providing Clients with a remote get/put interface to a cache stored on a Server, the Server provides the Clients with some or all of the metadata hash map that contains key-value pairs made of the data records' keys paired to metadata comprising their remote RDMA pointers and the keys' version identifiers. The metadata hash map allows the Client to look up a data record's metadata using a key, and then access the data record in the cache on the Server using the remote RDMA pointer in a one-sided RDMA operation and performing a comparison with the version identifier for the key.

The complete metadata hash map is stored on the Server, while the Clients may store only a subset of entries from the metadata hash map. At startup, the Client starts with an empty metadata hash map, which is then updated as operations are performed by the Client. Specifically, the Client uses its metadata hash map to locally look up a handle for a data record in the remote cache and then uses the handle to directly perform CRUD (Create, Read, Update, Delete) operations on the data record in the cache on the Server using RDMA operations.

Consequently, this invention reduces memory costs because the DAG-structured computations may be only stored once for a distributed computing cluster environment. The present invention essentially provides a global cache for the DAG-structured computations that are shared in the distributed computing cluster environment.

This invention also uses a dynamic work-stealing scheduler integrated with the hash-based distributed shared memory that fully leverages RDMA-capable networks. The advantages of this invention over the prior art includes:
  (1) Fully leverage RDMA to read and write DAG nodes located in a remote machine memory at nearly the speed of local accesses,
  (2) Enable dynamic scheduling through work-stealing by using ultra low latency communication schemes using RDMA, and
  (3) Enable the transparent access of local and remote DAG nodes using a generic hash map interface, abstracting the notion of target machine.

It is also noteworthy that traditional approaches could be run on a RDMA-capable computing cluster and even benefit from it, thanks to the higher bandwidth of an RDMA-capable network interconnect as compared, for example, to a message passing interface (MPI). However, traditional approaches would still be plagued by their use of active messaging, consuming CPU cycles on both local and remote machines, and eventually leading to a scalability and performance cap.

Moreover, using RDMA merely for active messaging does not leverage all the capabilities of RDMA. The main benefit of RDMA lies in reading and writing a memory region from a local compute node without involving the CPU of a remote compute node. The present invention not only enables the work-stealing scheduler to send low-latency "steal" messages with RDMA, but also enables that scheduler to remotely access (some or part of) the DAG nodes without involving the CPU of a remote compute node.

Description of Storing DAG-Structured Computations in the Cache

The present invention enables sharing DAG-structured computations within one compute node, and across multiple different compute nodes in a computing cluster, using an RDMA-enabled, in-memory, distributed, metadata hash map that is used to access one or more Servers storing a cache comprised of the DAG-structured computations.

This invention describes an execution environment for DAG-structured computation on RDMA-connected computing clusters. It proposes to limit the effect of uneven spatial and temporal graph distributions over multiple physical machines by leveraging RDMA.

The workload associated with the DAG-structured computations is evenly distributed using distributed work-stealing schedulers that work in conjunction with an RDMA-aware, distributed key/value store. The DAG data records are loaded into the distributed key/value store observing the following model: the ID of the DAG node, a uniquely identifiable 64-bit integer, is used as the key; the data corresponding to the DAG node (i.e., the task and its constraints) is spread across one or more domains (also referred to as maps) depending on their access patterns (read-only/read-write); and the tasks associated with the DAG node are scheduled using the ID of the DAG node.

Thus, the present invention combines RDMA and work-stealing into a programming model fit for large-scale graph computation, not only limiting the effect of accessing remotely distributed data thanks to single-sided communications (RDMA), but also increasing the usability of large distributed computing clusters to more high-level, graph model programmers. With the present invention, a graph model programmer does not need to know about remote machines, remote addresses, and has the guarantee that the computing cluster CPUs are dedicated to the DAG-structured computations and not the I/O runtime.

The benefits of the proposed invention include the following:
  (1) Each DAG-structured computation is only stored once in the entire computing cluster, saving memory.
  (2) Thanks to RDMA, each task of the DAG-structured computations can be accessed quickly, e.g., in a matter of single-digit microseconds.
  (3) Data other than the DAG-structured computations can also be made globally accessible through the cache.
  (4) Thanks to the speed of RDMA-capable interconnects, the overhead of fetching a remote object is quite low, e.g., virtually null.

Exemplary DAG-Structured Computations

Figure 6:
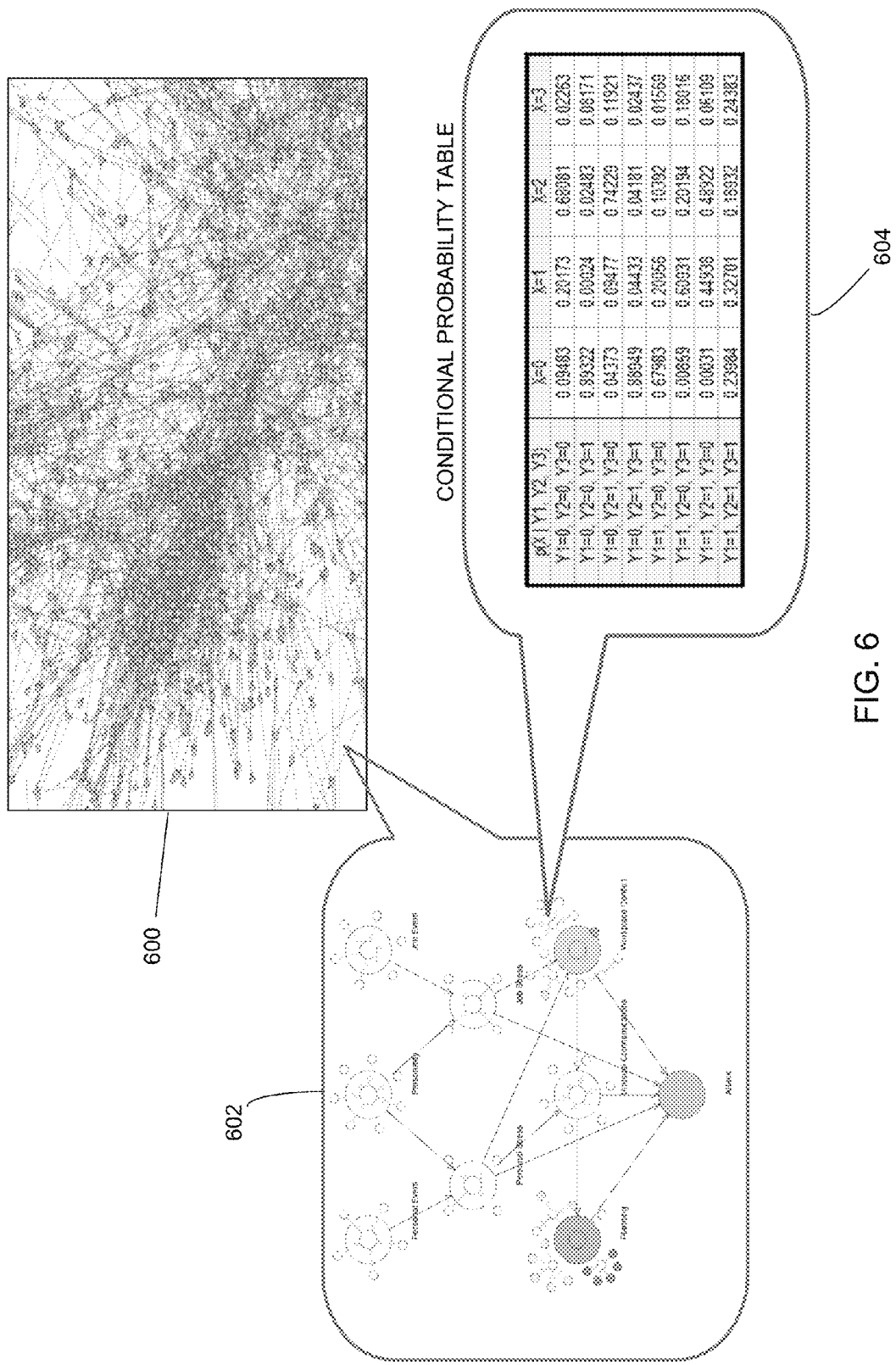
FIG. 6 illustrates a method for inferring anomalous behavior in a social network according to one embodiment of the present invention.

Consider an example problem represented by FIG. 6 for inferring anomalous behavior in a social network. Block 600 is a graphical representation of a social network, wherein the nodes represents individuals in the social network and the edges represent relationships between the individuals. DAG-structure 602 is used to model the social network 600, wherein each DAG node comprises a random variable and each DG edge represents a conditional dependency between DAG nodes. Table 604 is a conditional probability table (CPT) for the DAG-structure 602 that provides a value for each of the DAG edges describing the interaction between the DAG nodes connected by the DAG edges.

The present invention can be used to:

Schedule large scale loopy Bayesian inference in Bayesian network on computing clusters, Map computations of belief propagation to distributed memory high performance computing (HPC) architectures, and Provide an efficient scheduling framework to distributed DAG-structured computations.

Figure 7:
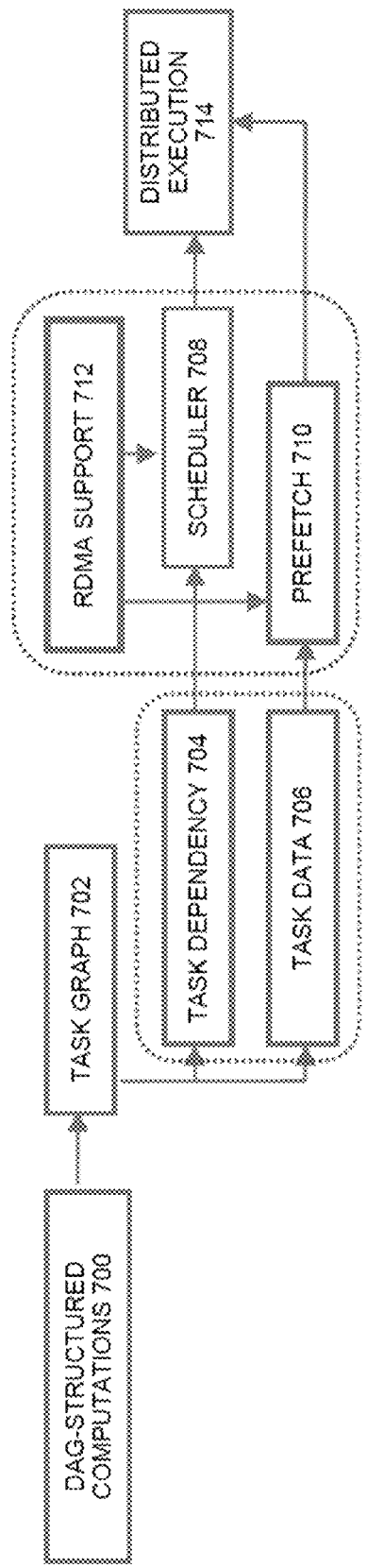
FIG. 7 illustrates a general framework for applying the present invention to DAG-structured computations.

FIG. 7 illustrates a general framework for applying the present invention to DAG-structured computations. The DAG-Structured Computation 700 is represented as a Task Graph 702, wherein the Task Graph 702 comprises a DAG structure. The Task Graph 700 is then analyzed to identify both Task Dependency 704 (i.e., the execution sequence of tasks) and the Task Data 706 (i.e., the data associated with the tasks). The Task Dependency 704 is used by the work-stealing Scheduler 708 to schedule the schedule the execution of the tasks, and the Prefetch 710 retrieves the Task Data 706 for use in the execution of the tasks. RDMA Support 712 provides RDMA operations to support both of these functions. The Distributed Execution 714 actually performs the execution of the tasks based on the Task Dependency 704 and using the Task Data 706.

The execution model for the present invention includes both a data path and a control path. The data path comprises a distributed, RDMA-enabled key/value store as described above, wherein values for keys can be written/read/updated/deleted using RDMA operations with no involvement of the target processor. The control path comprises the distributed work-stealing Schedulers on each compute node, wherein the tasks are distributed (stolen) from a root compute node.

Multiple data domains (e.g., read-only data, atomically shared data, etc.) can be used to improve concurrency. Distribution to other compute nodes is automatic thanks to the distributed shared memory (DSM) nature of the key/value (K/V) store.

Locality of the DAG nodes can be controlled using a placement function. The root compute node initially owns all of the tasks, but other compute nodes will "steal" tasks from the root compute node, wherein the messages used to steal tasks comprise low-latency RDMA messages.

Thus, the present invention can be used to dynamically schedule or re-schedule tasks in a work-stealing manner using data accessed from a cache by RDMA operations. This provides superior low latency as compared to existing computing clusters and is extremely good for load balancing. Moreover, there is no requirement for accurate estimates of task execution time. In addition, cache data is transferred between compute nodes or processors at most once, i.e., when a task is to be executed on a compute node or processor.

Peer-to-Peer (P2P) Cluster Architecture for Storing DAG-Structured Computations in the Cache In one embodiment, the computing cluster may be implemented as a Peer-to-Peer (P2P) Cluster Architecture, wherein the distributed metadata hash map is used by a Client to access a cache of data records comprising the DAG-structured computations stored by Servers that are distributed over the compute nodes of the P2P cluster. In this architecture, a compute node of the computing cluster may implement a Client, a Server, or both a Client and a Server.

Figure 8:
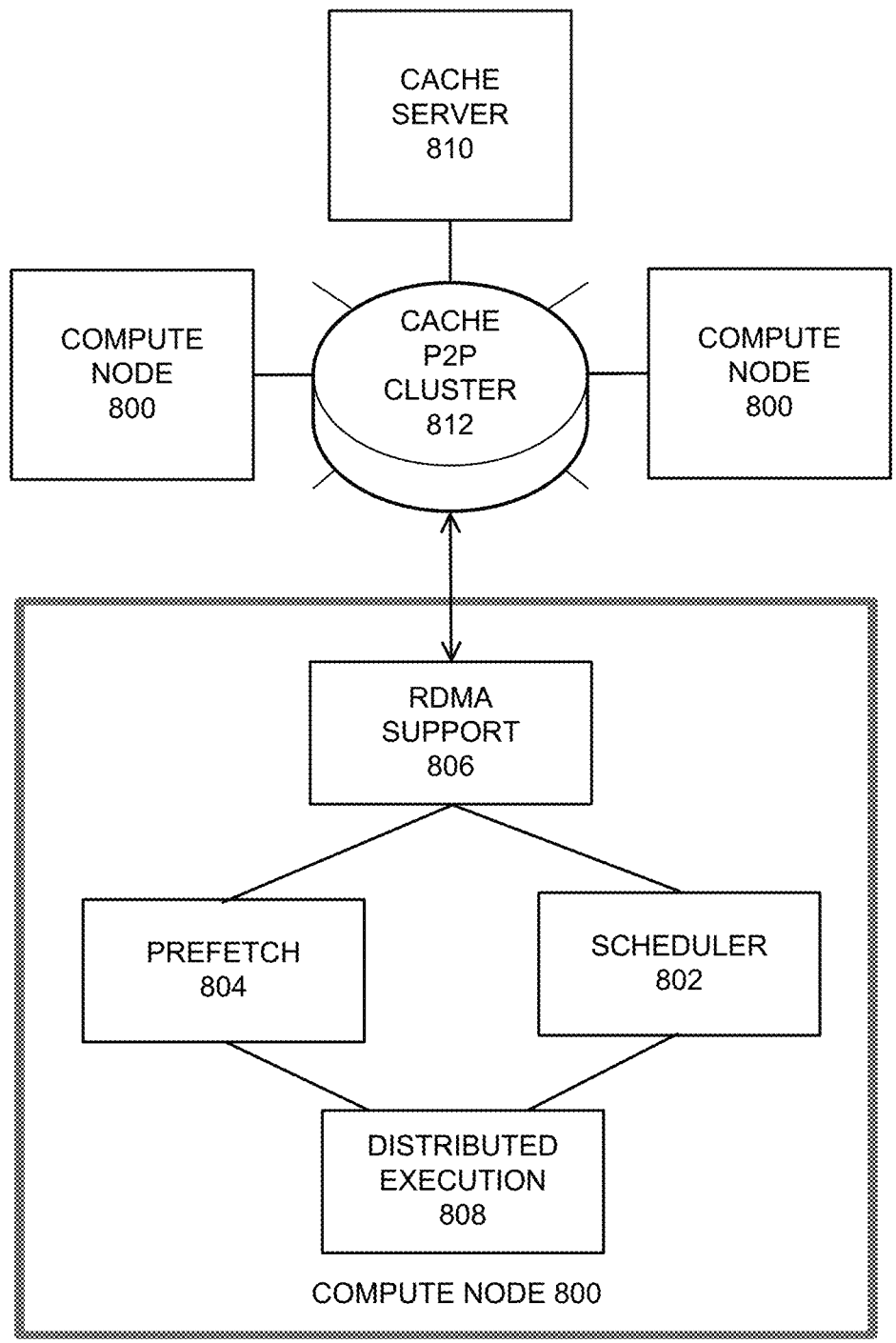
FIG. 8 is a schematic diagram that illustrates a Peer-2-Peer (P2P) Cluster Architecture implementation, according to one embodiment of the present invention.

FIG. 8 is a schematic diagram that illustrates the Peer-2-Peer Cluster Architecture implementation, according to one embodiment of the present invention. Specifically, the Peer-2-Peer Cluster Architecture includes a Compute Node 800 having a work-stealing Scheduler 802, Prefetch module 804, RDMA Support 806 and Distributed Execution module 808. The Scheduler 802 schedules the execution of one or more of the tasks, and the Prefetch module 804 retrieves the data associated with the tasks. The RDMA Support 806 provides RDMA operations to support both of these functions, i.e., using the metadata hash map to access data records stored in one or more Cache Servers 810 of the Cache P2P Cluster 812. The Distributed Execution module 808 actually performs the execution of the tasks. Consequently, the Compute Node 800 in FIG. 8 performs in the same manner as described for the Client 402 in FIGS. 4A, 4B, 4C and 5 above, while the Cache Servers 810 in FIG. 8 perform in the same manner as described for the Server 400 in FIGS. 4A, 4B, 4C and 5 above.

Figure 9:
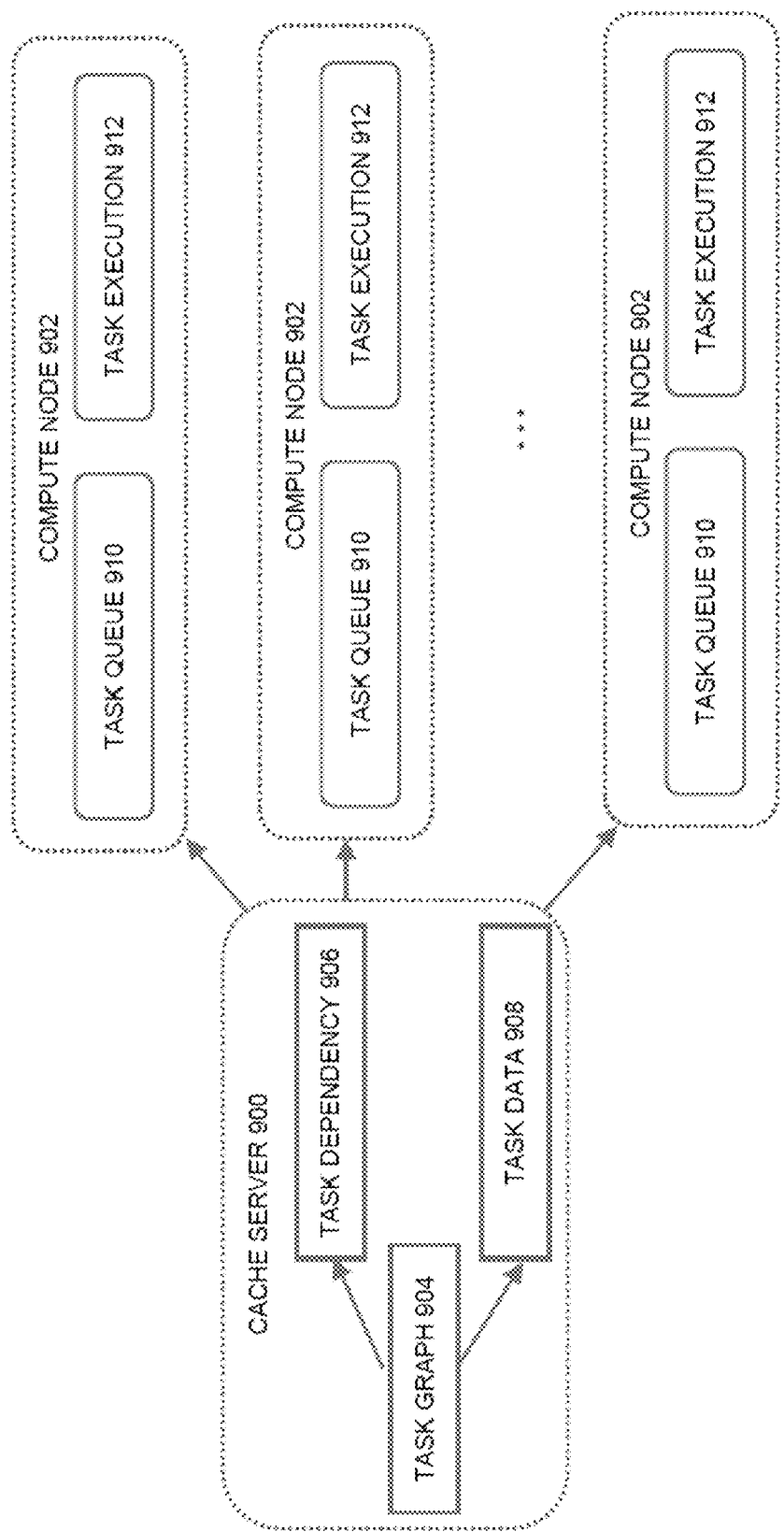
FIG. 9 is a schematic diagram that illustrates the parallel nature of task execution in the Peer-2-Peer Cluster Architecture implementation, according to one embodiment of the present invention.

FIG. 9 is a schematic diagram that illustrates the parallel nature of task execution in the Peer-2-Peer Cluster Architecture implementation, according to one embodiment of the present invention. Specifically, the Peer-2-Peer Cluster Architecture includes one or more Cache Servers 900 connected to a plurality of Compute Nodes 902. The Cache Servers 900 store the component parts of a Task Graph 904, including the Task Dependency 906 and Task Data 908. The component parts of the Compute Nodes 902, namely the Work-Stealing Scheduler, Prefetch, RDMA Support and Distributed Execution modules (not shown), work together to implement a Task Queue 910 and Task Execution 912. Thus, the Compute Nodes 900, operating independently and in parallel, use the metadata hash map to access data records 906 and 908 stored in the Cache Server 900 via RDMA operations, and then individually queue 910 and execute 912 the tasks associated with these accessed data records 906 and 908.

Other Examples of DAG-Structured Computations

This invention can be used for any number of different problems represented in large scale graphical models, including:

Collective anomalous behavior detection,

Detect abnormal behaviors of individual humans in a community or organization, wherein individual behaviors are detected by a single-person graphical model, and the detection results are enhanced by considering the collective influence described by a cross-person graphical model, Detect abnormal status of complex machinery or systems, Health care monitoring systems, Detect an individual's health status by various personal factors as well as the health status of people he/she contacts, Biological and medical research, and Analyze symptoms, which imply diseases, wherein the diseases can be caused by genetic abnormal expression or various other reasons.

Indeed, almost all programs can be represented by DAGs. For example, many "Big Data" analytic problems can be solved using graphs.

Consider, for example, that a belief propagation problem can be solved using DAG-structured computations, wherein the DAG-structured computations comprise a Bayesian network and a belief propagation step occurs on each DAG node in the Bayesian network. When executing the belief propagation step for a DAG node, incoming messages from parent DAG nodes and child DAG nodes are absorbed to update the local belief properties of the DAG node, and then outgoing messages are computed and generated for the parent DAG nodes and child DAG nodes.

From the work-stealing scheduler's point of view, the data flow in belief propagation comprises the following:
(1) Allocate the DAG according to a topological order of the DAG nodes.
(2) Allocate all DAG nodes without parent DAG nodes to compute nodes.
(3) Eliminate the allocated DAG nodes from the DAG.
(4) If the DAG is not empty, return to step (1) above.
(5) All DAG nodes without parent DAG nodes can be processed in parallel by the compute nodes.

In this example, the DAG usually has multiple topological orders, wherein an optimal order leads to improved load balance across compute nodes as determined by a dynamic scheduler. Moreover, rescheduling can be performed for load balancing purposes, wherein a local compute node "steals" the workload (DAG nodes) from other compute nodes, if the local compute node is idle. Such work-stealing achieves an efficiency within 95% of optimal. In addition, work-stealing schedulers require little information on task complexity estimates.

Advantages to Storing DAG-Structured Computations in the Cache

As noted above, in performing DAG-structured computations, the cache operates as described above in FIGS. 4A, 4B, 4C and 5 using RDMA-based operations, distributed hash maps and key/value pairs. Because the cache is an advanced key/value store, there are no limitations on the key and value formats. In addition, the cache supports RDMA-based CRUD operations. It is envisioned that, for this application, read and update operations would involve the client-side only, while create and delete operations would involve the server-side as well.

Moreover, the Client/Server Architecture and Peer-to-Peer (P2P) Cluster Architecture support partitioning, as well as replication, of the cache. The Client/Server Architecture also allows the Client to access multiple remote Servers, while the Peer-to-Peer (P2P) Cluster Architecture may co-locate a Client and a Server (as well as the entire cache or a partition of the cache) on one or more of the compute nodes.

Finally, prior work on inference in large graphical models does not leverage RDMA techniques. Moreover, prior work on message passing interface (MPI) implementations require participation of remote processors. Prior work also uses static scheduling on computing clusters for performance reasons, and prior work on dynamic scheduling requires migration of DAG nodes along with all its data.

Conclusion

This concludes the detailed description of the invention. The following describes some alternative embodiments for accomplishing the present invention.

Those skilled in the art will recognize many modifications may be made to this configuration without departing from the scope of the present invention. Specifically, those skilled in the art will recognize that any combination of the above components, or any number of different components, including computer programs, peripherals, and other devices, may be used to implement the present invention, so long as similar functions are performed thereby.

For example, any type of computer, such as a mainframe, minicomputer, or personal computer, could be used with and for embodiments of the present invention. In addition, many types of applications other than caching applications could benefit from the present invention. Specifically, any application that performs remote access may benefit from the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A system for accessing data stored in a cache of a server, comprising:
a server storing, in memory of the server, a metadata hash map that is associated with the cache of the server, wherein the metadata hash map includes one or more entries associated with one or more data records stored in the cache of the server, wherein each of the entries are associated with a key for a corresponding data record in the cache of the server, wherein each of the entries store metadata for the corresponding data record stored in the cache of the server, and wherein the metadata comprises a server-side remote pointer that references the corresponding data record stored in the cache of the server, wherein one or more of the data records comprises a directed acyclic graph (DAG), wherein the directed acyclic graph is comprised of a collection of one or more nodes connected by one or more edges, wherein each of the nodes represents one or more tasks ordered into a sequence, and wherein each of the edges connected to a node represents one or more constraints on the task represented by the node;
wherein the server provides the metadata hash map to a client, wherein the client accesses a selected data record stored in the cache on the server using a provided key by:
(1) identifying one or more potentially matching entries in the metadata hash map using a hash code for the provided key;
(2) accessing one or more data records stored in the cache on the server using the server-side remote pointers from the potentially matching entries in the metadata hash map; and
(3) determining whether the accessed data records match the selected data record using the provided key; and
wherein the client executes the tasks associated with the accessed data record using the constraints associated with the data record.

2. The system of claim 1, wherein the tasks of the directed acyclic graph are executed by a plurality of physically distributed clients.

3. The system of claim 1, wherein the client executes the tasks associated the accessed data record using a work-stealing scheduler.

4. The system of claim 3, wherein the work-stealing scheduler steals the one or more of the tasks associated with the accessed data record from one or more other compute nodes.

5. The system of claim 1, wherein the client obtains the constraints associated the accessed data record using a prefetch module.

6. The system of claim 1, wherein the client accesses the selected data record by performing one or more remote direct memory access (RDMA) operations on the client using the server-side remote pointer to directly access the data record stored in the cache on the server via an RDMA network interface controller.

7. A method for accessing data stored in a cache of a server, comprising:

storing, in memory of a server, a metadata hash map that is associated with the cache of the server, wherein the metadata hash map includes one or more entries associated with data records stored in the cache of the server, wherein each of the entries are associated with a key for a corresponding data record in the cache of the server, wherein each of the entries store metadata for the corresponding data record stored in the cache of the server, and wherein the metadata comprises a server-side remote pointer that references the corresponding data record stored in the cache of the server, wherein one or more of the data records comprises a directed acyclic graph (DAG), wherein the directed acyclic graph is comprised of a collection of one or more nodes connected by one or more edges, wherein each of the nodes represents one or more tasks ordered into a sequence, and wherein each of the edges connected to a node represents one or more constraints on the task represented by the node;

wherein the server provides the metadata hash map to a client, wherein the client accesses a selected data record stored in the cache on the server using a provided key by:

(1) identifying one or more potentially matching entries in the metadata hash map using a hash code for the provided key;

(2) accessing one or more data records stored in the cache on the server using the server-side remote pointers from the potentially matching entries in the metadata hash map; and (3) determining whether the accessed data records match the selected data record using the provided key; and wherein the client executes the tasks associated with the accessed data record using the constraints associated with the data record.

8. The method of claim 7, wherein the tasks of the directed acyclic graph are executed by a plurality of physically distributed clients.

9. The method of claim 7, wherein the client executes the tasks associated the accessed data record using a work-stealing scheduler.

10. The method of claim 9, wherein the work-stealing scheduler steals the one or more of the tasks associated with the accessed data record from one or more other compute nodes.

11. The method of claim 7, wherein the client obtains the constraints associated the accessed data record using a prefetch module.

12. The method of claim 7, wherein the client accesses the selected data record by performing one or more remote direct memory access (RDMA) operations on the client using the server-side remote pointer to directly access the data record stored in the cache on the server via an RDMA network interface controller.

13. A computer program product for accessing data stored in a cache of a server, said computer program product comprising:

a non-transitory computer readable storage medium having stored therein program instructions executable by one or more computers that cause the computers to perform the steps of:

storing, in memory of a server, a metadata hash map that is associated with the cache of the server, wherein the metadata hash map includes one or more entries associated with data records stored in the cache of the server, wherein each of the entries are associated with a key for a corresponding data record in the cache on the server, wherein each of the entries store metadata for the corresponding data record stored in the cache on the server, and wherein the metadata comprises a server-side remote pointer that references the corresponding data record stored in the cache on the server, wherein one or more of the data records comprises a directed acyclic graph (DAG), wherein the directed acyclic graph is comprised of a collection of one or more nodes connected by one or more edges, wherein each of the nodes represents one or more tasks ordered into a sequence, and wherein each of the edges connected to a node represents one or more constraints on the task represented by the node;

wherein the server provides the metadata hash map to a client, wherein the client accesses a selected data record stored in the cache on the server using a provided key by:

(1) identifying one or more potentially matching entries in the metadata hash map using a hash code for the provided key;

(2) accessing one or more data records stored in the cache on the server using the server-side remote pointers from the potentially matching entries in the metadata hash map; and (3) determining whether the accessed data records match the selected data record using the provided key; and wherein the client executes the tasks associated with the accessed data record using the constraints associated with the data record.

14. The computer program product of claim 13, wherein the tasks of the directed acyclic graph are executed by a plurality of physically distributed clients.

15. The computer program product of claim 13, wherein the client executes the tasks associated the accessed data record using a work-stealing scheduler.

16. The computer program product of claim 15, wherein the work-stealing scheduler steals the one or more of the tasks associated with the accessed data record from one or more other compute nodes.

17. The computer program product of claim 13, wherein the client obtains the constraints associated the accessed data record using a prefetch module.

18. The computer program product of claim 13, wherein the client accesses the selected data record by performing one or more remote direct memory access (RDMA) operations on the client using the server-side remote pointer to directly access the data record stored in the cache on the server via an RDMA network interface controller.

* * * * *